United States Patent
Huitema et al.

(10) Patent No.: US 7,956,820 B2
(45) Date of Patent: Jun. 7, 2011

(54) COMBINED SINGLE/MULTIPLE VIEW-DISPLAY

(75) Inventors: Edzer Huitema, Veldhoven (NL); Geardus P. Karman, 'S Gravenhage (NL); Rogier Cortie, Ittervoort (NL); Jaap Bruinink, Eindhoven (NL); Olaf Gielkens, Eindhoven (NL); Antonius G. H. Verhulst, Veldhoven (NL); Murray F. Gillies, Eindhoven (NL); Michel C. J. M. Vissenberg, Roermond (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 760 days.

(21) Appl. No.: 11/917,157

(22) PCT Filed: Jun. 13, 2006

(86) PCT No.: PCT/IB2006/051881
§ 371 (c)(1),
(2), (4) Date: Dec. 11, 2007

(87) PCT Pub. No.: WO2006/134554
PCT Pub. Date: Dec. 21, 2006

(65) Prior Publication Data
US 2008/0211734 A1    Sep. 4, 2008

(30) Foreign Application Priority Data
Jun. 14, 2005 (EP) .................. 05105192

(51) Int. Cl.
G02F 1/01 (2006.01)
G02F 1/167 (2006.01)

(52) U.S. Cl. ............ 345/3.1; 345/1.1; 345/107

(58) Field of Classification Search .......... 345/1.1, 345/3.1, 107
See application file for complete search history.

(56) References Cited

U.S. PATENT DOCUMENTS

| 5,969,850 | A | * | 10/1999 | Harrold et al. ............ 359/320 |
| 6,271,896 | B2 | | 8/2001 | Moseley et al. |
| 6,621,541 | B1 | | 9/2003 | Choi |
| 2004/0150767 | A1 | | 8/2004 | Kim |
| 2004/0240777 | A1 | | 12/2004 | Woodgate et al. |
| 2006/0056791 | A1 | * | 3/2006 | Tzschoppe ............ 385/146 |

FOREIGN PATENT DOCUMENTS

| EP | 0833183 A1 | 4/1998 |
| EP | 1072924 A2 | 1/2001 |
| GB | 2352573 A | 1/2001 |
| WO | 03023511 A2 | 3/2003 |
| WO | 2004057878 A2 | 7/2004 |
| WO | 2004099862 A2 | 11/2004 |

* cited by examiner

*Primary Examiner* — Amare Mengistu
*Assistant Examiner* — Jennifer Zubajlo

(57) ABSTRACT

The present invention relates to a display device comprising an outer display stacked with an inner display and being arranged to be operable in a first, multiple view mode and a second, single view mode. An idea of the invention is to arrange an electrophoretic display on top of an emissive display. The display device may be operated in two modes; a first mode being a multiple or dual view mode and a second mode being a single view mode. In order to activate the single view mode, the outer display is set in a transparent state and the inner display is turned on, such that it displays desired objects. In the multiple view mode, the outer display is functioning as a 3D-barrier. Hence, some of the picture elements of the outer display are set in a transparent state while others are set in an opaque state. The viewer sees a different picture with each respective eye, and will accordingly experience a multiple view picture of an object that is displayed on the inner display.

14 Claims, 3 Drawing Sheets

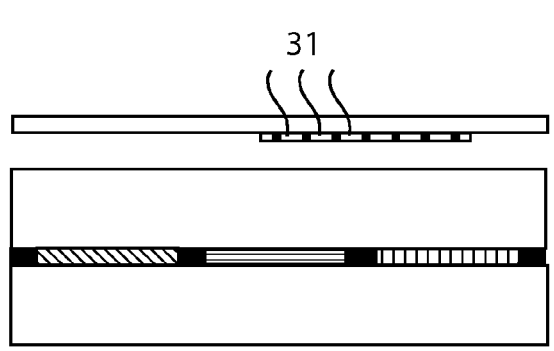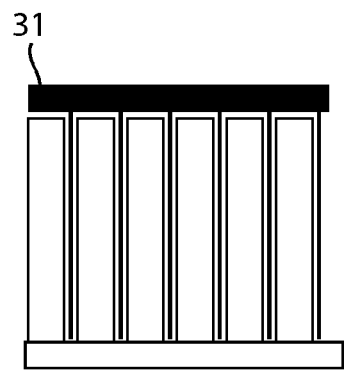
Fig. 3a    Fig. 3b
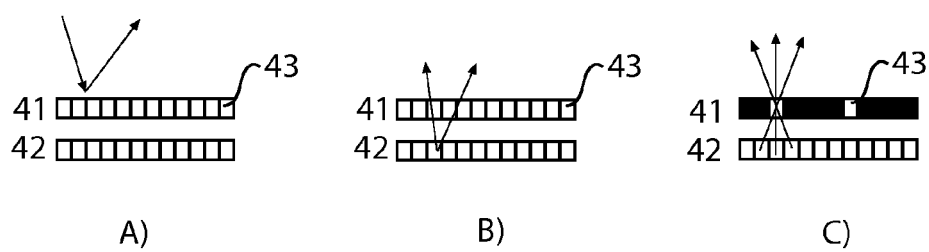
Fig. 4
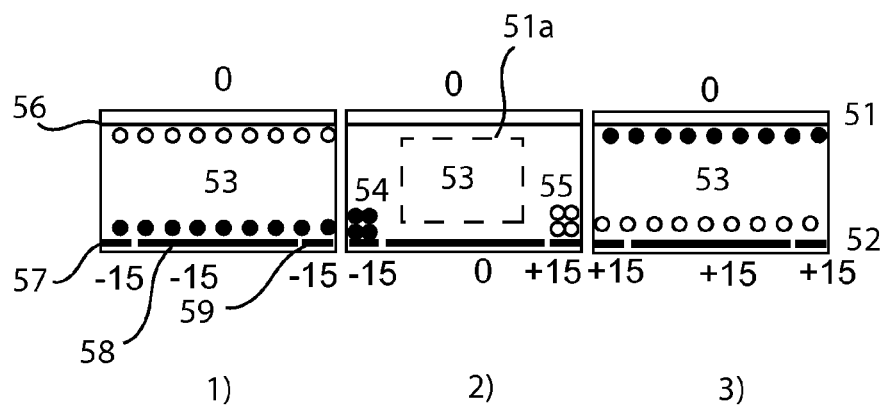
Fig. 5

COMBINED SINGLE/MULTIPLE VIEW-DISPLAY

The present invention relates to a display device comprising an outer display stacked with an inner display and being arranged to be operable in a first, multiple view mode and a second, single view mode.

At present, two trends in displays for mobile phones can be seen. A first trend is to provide ultra low power displays and a second trend is to provide displays with added value, such as displays that can combine a single view mode with a multiple view mode. The term "a multiple view mode" encompasses dual view mode as well as 3D mode.

The trend towards ultra low power "paper-like" displays is often realized by means of electrophoretic displays, such as eink displays. The fundamental principle of electrophoretic displays is that the appearance of an electrophoretic medium encapsulated in the display is controlled by means of electrical drive signals. In more detail, a reflective electrophoretic display comprises a top transparent layer, a bottom layer and a plurality of microcapsules arranged between the top layer and the bottom layer. The microcapsules are filled with charged pigmented particles that have different charge polarity and color and that are dispersed in an electrophoretic medium, such as a fluid, encompassed by the microcapsule. For example, in case of a grey-scale display, black and white particles of opposite polarities are used. Further, each microcapsule has a top and bottom electrode associated with it in order to displace the particles therein by means of applying the drive signals to the electrodes. For instance, when applying a positive (with respect to the top electrode) electric field to the bottom electrode, which faces the interior of the display, the (positively charged) black particles move to the top of the microcapsule, towards the transparent top electrode in the direction of the display exterior, where they become visible to a viewer of the display. This makes the surface of the display appear dark at locations, where the black particles are positioned. Consequently, the (negatively charged) white particles move to the bottom of the microcapsules, towards the pixel electrode in the direction of the display interior, where they are not visible to the viewer of the display. By reversing the electrical field applied, the white particles move to the top of the capsule, which now makes the display appear white at that position. When the electric field is removed, the display remains in the acquired state and thus exhibits a bi-stable character. This electrophoretic display with its black and white particles is particularly useful as an electronic book. The electrophoretic displays have long response times, which make them unsuitable for displaying picture sequences or movies.

To comply with the second trend, a 3D-display or a dual view display is provided. A 3D-display is obtained by means of displaying a number of pictures of an object, which pictures are taken from different angles, to a viewer. A dual view display shows different images at different angles. With a 3D-display, each one of the eyes of the viewer is exposed to the different pictures by means of for instance polarized or colored glasses, such that the object appears to be in 3D. Another way to achieve this is by means of a barrier structure display. This approach is referred to as auto-stereoscopic, as it does not require any additional aid (glasses etc as above). These structures are sometimes referred to as 3D-shutters or 3D-barriers. The barriers can be either static or dynamic. If the barrier structure is dynamic, the display may be operated in 2D (using the full resolution of the display) or 3D, and if a static barrier structure is switched to 2D the same resolution must be used. This will be explained further in the following.

The static barriers can simply be formed by placing a plate with correctly located barriers in front of a liquid crystal display (LCD). The plate allows half of the pixels to be seen by the right eye of the viewer and half of the pixels by the left eye. If one wishes to use this technique to create a dual view display, it is necessary to locate the barriers at a different position than that for a 3D-display. A disadvantage is that in order to achieve two well-separated viewing cones, it is necessary to have the barriers at only 0.1 mm distance from the LCD. As the distance between the barriers and the LCD is determined by the glass thickness, a glass thickness of 0.1 mm is required (typically, for LCDs, the glass thickness is 0.7 mm).

Another technique that is used to create a 3D-display is to insert an extra color filter plate on the side of the display facing the viewer, such that pixels of a specific color are seen from some angles whereas pixels of other colors are non-visible from the same angles. Hence, a first viewer looking at the display from a first angle sees a first group of pixels, but does not see other pixels. The opposite is true for a second viewer looking at the display from a second angle: the second viewer is able to see a second group of pixels, but is not able to see other pixels (such as the first pixel group). By displaying different content on the different pixel groups, a dual view display is created. As with opaque barriers, color filters cannot be switched off. This means that for automotive applications, the display always has a reduced resolution even if only a driver is present (or both a passenger and the driver are viewing the same content). However, unlike opaque barriers it is not necessary to switch half the pixels off. The perceived resolution is therefore only one half (due to distribution over two views) of the actual resolution. It is important to note that it is essential that the color filters of the additional plate only transmit one primary color and do not leak other wavelengths. In practice, this is not easily attainable and the standard color filter materials certainly do not achieve this.

The dynamic barriers, which exist on the market today, enable the manufacturing of a combined 2D/3D-display. A combined 2D/3D-LCD comprises a top LC display that faces the viewer and is arranged on a bottom color LC display. The display further comprises a top and a bottom polarizer which are aligned with each other. The 2D mode is achieved by switching off the top LCD, whereby the top LCD enters a transparent mode, which makes the bottom LCD visible. The bottom color LCD is now used in "normal" manner, using its full resolution, as it would be used in any LCD. The 3D mode is achieved by operating the top LCD and the bottom color LCD simultaneously. The top LCD is used as a parallax barrier, which is operated such that it displays a grid (or netting) of black lines with transparent spaces between the lines. In the 3D-mode, the positions of the LC material where the barriers should be are addressed such that the polarization of the light passing through these areas is rotated. Since the polarization of this transmitted light is now perpendicular to the polarizer, the transmitted light is blocked. Depending on the exact position of the viewer, a particular pixel is therefore blocked by the barrier. By choosing the correct geometry it can be arranged such that the viewer sees some pixels with his right eye and some with his left eye (a lower resolution is attained as some pixels are seen by one eye and some pixels by the other). This results in the perception of a 3D image. By adjusting the grid in the top LCD, different angles of an object can be displayed to a non-moving viewer. If the viewer is moving and the grid is constant, the viewer will see the object from different angles.

US2004/0150767 discloses a display apparatus for selectively displaying a 2D image and a 3D image. This display apparatus comprises a flat panel display device, which generates a 2D image when 2D mode is requested and generates viewpoint images having parallax when 3D mode is requested. Further, the display apparatus comprises a switching panel, which is arranged in front of the flat panel display device, which panel is separated from the flat panel display device by a predetermined distance, and which panel is controlled according to what type of image is generated by the flat panel display device so that two-dimensional images and three-dimensional images can be displayed. The problems of known combined 2D/3D-displays can be summarized as follows:

such displays suffer from high power consumption, which is an undesired property of displays for handheld devices, such as mobile phones or PDAs, these displays are limited to applications where the location of viewer is well defined, because the transmission though the 3D-barrier is angle dependent. Further, this 2D/3D-technology suffers from a limited viewing angle. The viewer can look through the barrier at very large angles with respect to the normal of the screen. For the dual view mode, this results in mixing of the two different images, whereas for a stereo 3D mode it results in the fact that the viewer perceives a weaker 3D effect, the combined 2D/3D displays comprise a very simple top LCD (passive matrix) with large pixels it is not easily optimized for a good viewing angle. This means that the position where good 3D is observed is very limited in space, the distance between the primary and secondary LCDs is always the glass thickness of the top plate of the primary LCD plus the thickness of the bottom plate of the secondary LCD. This distance is usually rather large, 1.4 mm, and results in a large overlap between views, and the extra glass plates and the polarizer of the secondary LCD also contribute substantially to the panel cost when considering television applications where 32 inch panels are now standard.

An object of the present invention is to provide a combined single view/multiple view display device, which mitigates the above mentioned problems.

This object of the invention is met by the device as set forth in the appended independent claim 1.

An insight is that by providing an electrophoretic barrier structure, whose picture elements are operable in at least one opaque state, i.e. a reflective and/or absorbing state, or one transparent state, an improved multiple view display that alleviates problems of prior art is achieved.

According to an aspect of the invention, there is provided a display device comprising an outer display stacked with an inner display. The display device is arranged to be operated in a first, multiple view mode (or dual mode) and a second, single view mode. The outer display is an electrophoretic display that is controllable to enable the display device to be operated in the first and the second mode, wherein the first and second mode are achieved by means of controlling a potential difference across picture elements in the outer display. The picture elements in the outer display are operable in at least one opaque state and one transparent state. The first display mode being attained by arranging the inner display in an on-state and by arranging at least one of the picture elements of the outer display in the transparent state while the other picture elements are in the opaque state. The second display mode is attained by arranging the inner display in the on-state and by arranging the picture elements of the outer display in the transparent state.

An idea of the invention is to arrange an electrophoretic display on top of an emissive display, such as an LCD or an organic LED (OLED). The electrophoretic display is referred to as the outer display, which faces a viewer of the display, and the emissive display on which it is sandwiched is referred to as the inner display, i.e. the inner display is arranged on the side of the outer display which is directed towards the interior of the display device. The display device may be operated in two modes; a first mode being a multiple or dual view mode and a second mode being a single view mode. In order to activate the single view mode, the outer display is set in a transparent state and the inner display is turned on (on-state), such that it displays desired objects. In the multiple view mode, the outer display is functioning as a 3D-barrier. Hence, some of the picture elements of the outer display are set in a transparent state while others are set in an opaque state. This has as an effect that some pixels of the inner display are seen by a viewer with his left eye, some are seen by the viewer with his right eye and some pixels of the inner display are blocked out by pixels of the outer display being set in a opaque state. The picture elements of the outer display are operable in at least one opaque state, such as black (or virtually any color). The different modes of the electrophoretic display are achieved by means of controlling a potential difference across its picture elements to cause charged particles arranged in an electrophoretic medium of the electrophoretic display to move. If a black state is to be accomplished, it is sufficient to have charged black particles in the electrophoretic display. The potential difference is achieved by applying drive signals to electrodes associated with each picture element. Hence, any one of the transparent state or the at least one opaque state is obtained by means of applying the drive signals.

The viewer sees a different picture with each respective eye, and will accordingly experience a 3D-picture of an object that is displayed on the inner display. The 3D-mode may alternatively be a dual view mode, which is attained by displaying different objects on different pixel groups of the inner display while operating the outer display as a barrier. The use of an electrophoretic display as barrier substantially improves the viewing angle as compared with LCD-barriers.

In an embodiment of the present display device, the outer display is further arranged to be controllable to enable the display device to be operated in an advantageous third, low-power mode capable of displaying objects in 2D. In the third mode, the display device is consuming less power than in the second mode, which also enables displaying of objects in 2D as described in the above. The third display mode is attained by turning the inner display off (or possibly in a stand-by mode) and by setting the picture elements of the outer display in opaque states, for instance black and white in case particles of these two particular colors are comprised in the electrophoretic display, in accordance with image information to be displayed on the electrophoretic display.

Grayscales or intermediate optical states in electrophoretic displays are generally provided by applying the drive signals, to the electrodes for specified time periods, which has the effect that the black and white particles will migrate back and forth in the electrophoretic medium, and thus the viewer will experience that the display appears to adopt different intermediate optical states, i.e. different levels of gray. The use of black and white particles has the advantage of providing high contrast between the picture elements and improved image quality. It is also possible to arrange some particles to be of yet another color. Advantageously, in case a color electrophoretic display is to be provided, particles of different colors are arranged in different picture elements. For example, to create a color filter functionality, there may be three groups of particles present, each having a different color (such as red, green and blue). As the picture elements further are operable in a transparent state, it is possible to turn the color filter on or off.

Further, the electrodes are arranged to attract, by means of applying the drive signals, the charged particles such that the transparent state is obtained. The electrodes are arranged in such a manner, preferably at the peripherals of the picture elements in the electrophoretic display, that they attract the respective charged particles, wherein a substantially particle-free area is created for the picture elements in the electrophoretic display that are to be set in the transparent state. This has as an effect that the electrophoretic display, i.e. the outer display, appears to be transparent to the viewer.

In another embodiment of the combined single view/multiple view display device of the present invention, the inner display is an emissive display, which has the advantage that it is independent of ambient illumination.

In yet a further embodiment of the display device of the present invention, the outer display is arranged to have a resolution that is higher than the resolution of the inner display. This makes it possible to shift the barrier such that the point where high quality multiple view mode can be viewed (the "sweet spot") is located near the viewer rather than having a static sweet spot directly in front of the display.

Further features of, and advantages with, the present invention will become apparent when studying the appended claims and the following description. Those skilled in the art realize that different features of the present invention can be combined to create embodiments other than those described in the following.

The present invention will be described in more detail with reference made to the accompanying drawings, which is provided by way of non-limiting example and on which:

FIG. 3 shows finger electrodes in a cross-sectional view and a planar view. The finger electrodes are designed to avoid reduced brightness of specific pixels;

FIG. 4 shows an embodiment of a multiple view display in accordance with the present invention;

FIG. 5 shows a principle view of an electrophoretic display employed in the present invention;

Figure 1A:
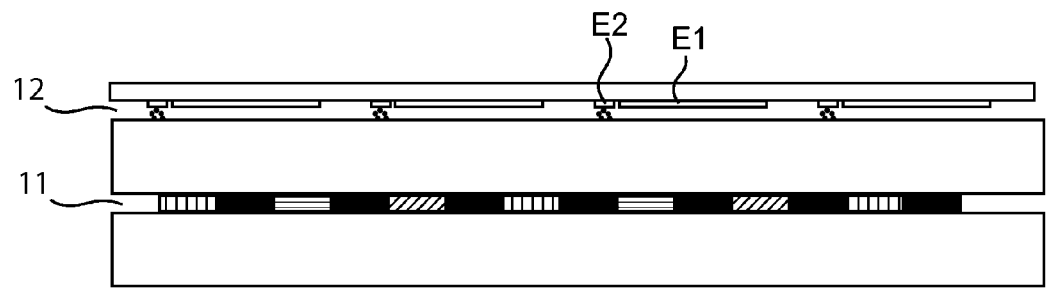
FIG. 1 shows an embodiment of the present invention for providing a dual-view display.
Figure 1B:
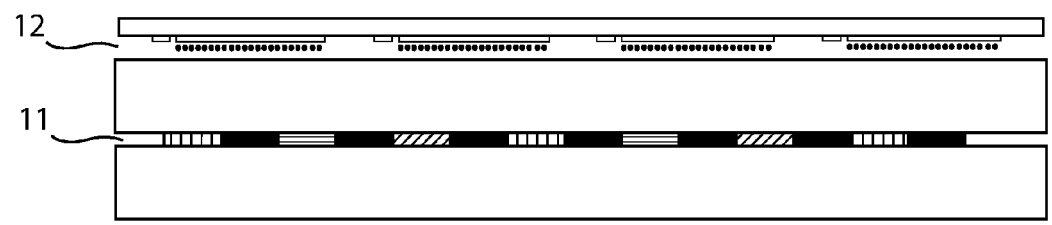

In FIGS. 1a and b, there is shown a display device according to an embodiment of the present invention, which display device comprises an LCD (11) equipped with an electrophoretic display (12). This display device can be operated to create a multiple-view display.

First, consider the electrodes in the electrophoretic display (12), which electrodes have been split into two sections. These electrode sections will be referred to as E1 (a barrier electrode) and E2 (a reservoir electrode). Both are fabricated from a transparent conductive layer (e.g. ITO). The relation in area between these electrodes (E1/E2) is chosen to be 10:1. However, this is by no means limiting, and a skilled person realizes that other area relations is possible, as long as the particles are gathered at an electrode area small enough to make the pixel appear transparent. In this example, all particles are colored black and have a certain polarity, for instance positive. When the display device is to be switched between the two possible modes, the barrier (E1) and reservoir (E2) electrodes are grouped into two separate groups for driving. By applying a negative voltage to the E2 electrodes while holding the E1 electrodes at ground, the particles are drawn to the E2 electrodes due to their polarity. This results in the situation shown in FIG. 1(a), where the barrier (E2) is only a tenth of the size needed for dual view, which has as an effect that the electrophoretic display (12) appears to be transparent and the display device functions as a 2D display. The electrophoretic display is arranged to be controllable by applying drive signals to electrodes associated with each picture element, which causes the charged particles to move. Thus, either the opaque state or the transparent state is obtained. Due to the bi-stability of the electrophoretic material used in the outer display, no voltage is required after the appliance of the drive signals and the particles stay anchored to the electrode E2. Moreover, the particles may have great amounts of charge to allow low driving voltages. To switch to the multiple view/dual view mode, the voltage polarity is reversed and the barrier electrodes (E1) are made negative. This results in particles being distributed over the barrier electrodes (E1). This blocks the light emitted from the LCD (11) and the switchable barrier is in position for dual view. Coverage of the barrier electrode (i.e. the area of the electrode which is covered by particles when the display device is in its 3D-mode) depends on the number of particles and for the dual mode/3D-mode, a large coverage is needed to obtain low leak transmission through the barrier electrode (E1).

Figure 2:
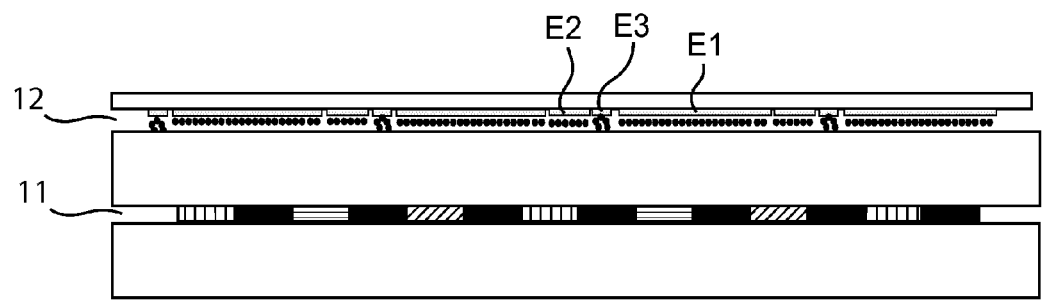
FIG. 2 shows another embodiment of the present invention, in which embodiment an additional electrode is provided in the electrophoretic display to allow variable grey filter control.

The above described embodiment can be extended such that the barrier electrode and an additional gap electrode function as a switchable variable grey filter. As can be seen in FIG. 2, the additional gap electrode is arranged in the space between the already existing electrodes E1 and E2 and is denoted E3. By applying a negative voltage to E3 and E1 for a short period, only a fraction of the particles cover the electrodes. In this case, with a non-100% coverage, i.e. the electrodes are not completely covered with particles, the barrier acts as a grey filter.

In FIGS. 3(a) and (b), another embodiment of the invention is described. The electrodes are arranged as interlocking finger electrodes (31) in this embodiment. In FIGS. 3(a) and (b), the finger electrodes are shown in cross-section and planar views, respectively. The area relation between E1 and E2 would still be 10:1 but the reservoir electrode would be distributed over more but smaller areas. Such finger electrodes have the advantage of faster switching times.

In FIG. 4, a principle diagram of a transflective 3D display device according to another embodiment of the present invention is shown. The 3D display device comprises a top (or outer) electrophoretic display (41) and a bottom (or inner) color LC display (42).

The specially designed electrophoretic display of the present embodiment is shown in FIG. 5. The electrophoretic display comprises a transparent top panel (51), a bottom panel (52), a plurality of microcapsules (or micro cups) (53), two groups of electrophoretic particles (54, 55), that are different in charge polarity and color (e.g. negatively charged, white particles and positively charged, black particles), are arranged in a transparent fluid. The microcapsules are located between the panels and the particles are disposed in each microcapsule. A top (56) and a bottom (57, 58, 59) electrode is associated with each microcapsule and in this particular exemplifying embodiment, the bottom electrode is arranged to be divided into three sections, two outer sections (57, 59) and one middle section (58), each section being arranged such that it can be set to have a polarity which differs from the polarity of the two other sections.

Hence, by controlling the polarity of the three sections (57, 58, 59) of the bottom electrode, the particles are moved, wherein the microcapsules, and consequently the picture elements (53), are set in any one of the opaque states (1, 3) or the transparent state (2). A drive signal applied to the respective section of the bottom electrode has an energy, defined as the product of the drive signal voltage and the time during which the drive signal voltage is applied, sufficient to bring charged particles comprised in the electrophoretic display into a position which corresponds to image information to be displayed. This may be an intermediate optical state in-between the two extreme optical states 1 and 3 of FIG. 5, in which particles of one polarity are located at the top electrode (56) and particles of the opposite polarity are located at the opposing bottom electrode (57, 58, 59). The required energy of the drive pulse depends on the desired transition of the optical state.

As can be seen in FIG. 5, the picture elements (53) of the electrophoretic display can be switched into three states: white is denoted by 1, transparent is denoted by 2 and black is denoted by 3. As described in the above, the bottom electrode is divided into three sections. In state 2, the respective outer section attracts particles of the corresponding polarity, wherein the picture element appears to be transparent, since the main part of the picture element, i.e. the part formed by the middle electrode, is free from particles (51*a*).

The electrode configuration shown in FIG. 5 can be realized by using an active-matrix configuration with three thin film transistors (TFTs) per picture element (one for each section of the bottom electrode). This number of TFTs per pixel is equal to the number of TFTs per picture element of the underlying LCD, if it is a color LC display. It is preferred to have one common row electrode and separate column electrodes for the TFTs. However, it would be possible to use a setup with three row electrodes and one column electrode for the TFTs.

Figure 6:
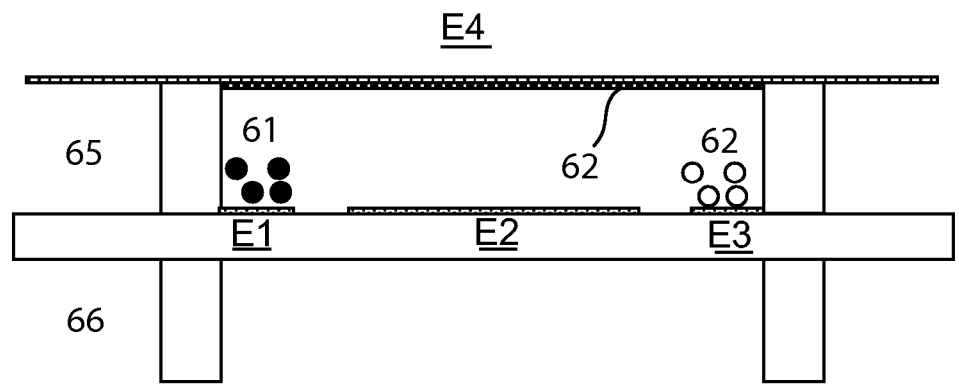
FIG. 6 shows a pixel structure with OPC on the upper electrode.

In another embodiment of the present invention, the electrode configuration uses an organic photoconductor (OPC) layer arranged within the electrophoretic pixels. This layer may for instance comprise polyvinyl carbazole (PVK) with a trinitrofluorenone doping. This configuration eliminates the TFTs and reduces the number of drivers needed. In FIG. 6, at least one of electrodes E1, E2, E3 and E4 has been covered with an OPC layer and the electrodes are interconnected such that only four drivers are needed to drive each electrophoretic pixel.

By way of example, the E4 electrode is covered with the OPC layer. FIG. 6 shows a schematic cross-section of the pixel. By applying a voltage of a first polarity between the electrodes E2 and E1, and a voltage of another polarity between E2 and E3, the state shown as state 2 in FIG. 5, i.e. the transparent state, can be attained with this pixel structure. However, it is noted that the electrodes E1, E2 and E3 cannot be controlled individually for each pixel i.e. all pixels can simultaneously gather the particles at electrodes E1, E2 and E3. As an effect, image information cannot be displayed, but the display can be switched between single view and multiple view modes. It is, in contrast to the above, possible to display image information on the electrophoretic display by means of illuminating the electrophoretic picture elements with the LCD pixels of the inner display. This is simply done by displaying the desired image (or the inversion thereof) on the LCD, as explained in the following.

First, a voltage of a first polarity, e.g. +15V, is applied to E1, E2 and E3, and E4 is held at 0V, which has as an effect that the black particles (positively charged) will be gathered at E4, whereas white particles (negatively charged) will be attracted to E1, E2 and E3. Then, the underlying LCD panel is operated to display a completely white image. The illumination from the underlying LCD panel has the effect of decreasing the resistance of the OPC layer of E4, roughly by a factor of $10^4$. The white image displayed by the underlying LCD panel is now removed and instead, the image information to be displayed is shown on the LCD panel. Hence, portions of the OPC-coated electrode E4 (where each respective portion corresponds to one pixel of the electrophoretic display) that are not illuminated are set in a mode of very high resistance, whereas portions of the OPC-coated electrode E4 that are illuminated are set in a mode of low resistance. The low resistance portions may thus be driven to +15V, while E1, E2 and E3 are held at 0V. The non-illuminated portions will, because of their high resistance, be kept at 0V. Some pixels of the underlying LCD panel will, as defined by the image information to be displayed, be black and other pixels will be white (i.e. light is present). Due to the switched polarity, the illuminated pixels of the electrophoretic display change to the white state, as +15V will attract the negatively charged white particles at the electrode E4. At portions of the electrode E4 that are not illuminated, the resistance is very high, and the voltage at these high-resistance portions drop to substantially 0V, whereby the black particles remains at E4 and the pixels remain black.

If the initial state is an intermediate optical state, which is attainable by applying a "shaking voltage" between E2-E1 and E2-E3, −15V is applied to E1, E2 and E3 while holding E4 at 0V. The shaking voltage might e.g. comprise one voltage pulse or a number of voltage pulses. The shaking voltage generally has an energy sufficient to release particles present in one of the extreme states, but insufficient to enable the particles to reach the other one of the extreme positions. Since none of the LCD pixels are driven to illumination, the resistance of the OPC-coated electrode E4 is very high, and the −15V drops to 0V. Hence, the particles do not move. Next, the image is displayed on the underlying LCD. For the pixels of the electrophoretic display that are to be set in the white state, the LCD will be driven to display a white pixel, whereby the electrophoretic pixel is illuminated and the white particles move to the top surface, as these white particles are repelled by the −15V that is applied to E1, E2 and E3. At a pixel of the electrophoretic display where the corresponding portion of the electrode E4 is not illuminated, the set state is maintained. The voltage is now reversed and a negative representation of the image is displayed on the LCD. This results in black particles being brought to electrode E4 (attracted by the −15V) in electrophoretic pixels that are exposed to light (due to the fact that the negative image is displayed). Pixels in the white state are unaffected, as no light is generated in the negative image for these particular pixels.

Figure 7:
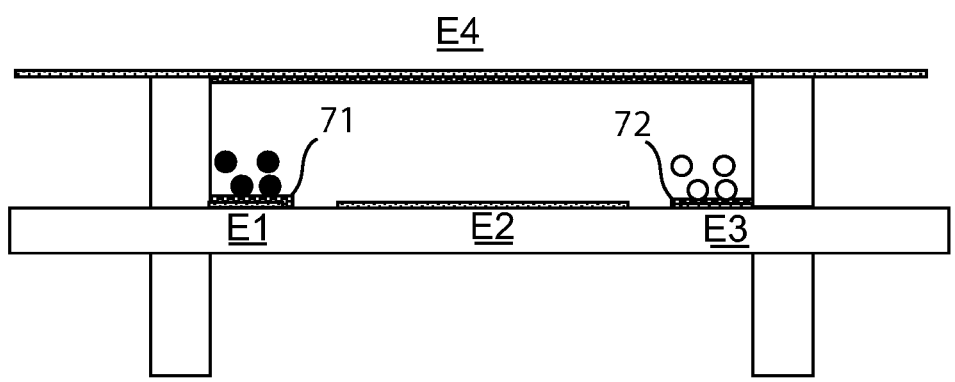
FIG. 7 shows a pixel structure with another placement of the OPC layer, i.e. electrode E1 and E2 are coated with an OPC-layer.

In another example, the electrodes E1 and E3 are covered with OPC. Once again, homogenous illumination and appropriate voltages on the electrodes are used to reset the display to the state shown in FIG. 7. As in the first example with an OPC layer, a local illumination of the photoconductor via the underlying LCD pixel will address selected white or black particles. After these have been selected, they can be transported to the viewing side via an appropriate voltage between E4 and E2.

It is understood that it is possible to construct a pixel, where the central electrode E2 is coated with OPC to allow writing via the local illumination of the light source.

The design and function of the color LC bottom display is known by the skilled person and will hence not be discussed in the present application.

With reference made again to FIG. 4, by combining the above described electrophoretic display (41) with the emissive color LC display (42), it becomes possible to switch the display device according to the invention into three modes:
A) a first single view, grey-scale, low-power mode,
B) a second, single view, color mode, and
C) a third, multiple view, color mode.

In the first mode (A), the bottom display (42) is switched off and has no function, in which mode the display device according to the invention works as a low-power 2D-display, effected by means of the top electrophoretic display (41). In this mode, with reference to FIG. 5, states 1 and 3 of the picture elements are activated. This is achieved by switching the three bottom electrodes (57, 58 59) of a picture element (53) in the electrophoretic display to the same voltage. Every picture element can be separately controlled to be set in any one of the different states, as the electrophoretic display layer of the display device according to the invention is used to generate a 2D-image of an object.

In the second mode (B), the electrophoretic display is switched into a transparent state (2) and the bottom LCD (42) is operated normally, in which mode the display device according to the invention is working as a normal color LCD. Hence, with reference to FIG. 5, all picture elements are in the second mode switched to state 2. This is done by setting one of the outer sections of the bottom electrode to a positive polarity, the other to a negative polarity, and the middle section to neutral polarity (i.e. ground).

In the third mode (C), the picture elements (53) of the electrophoretic display (41) are switched into the black state (3), except for an array of transparent (2) picture elements, such that the electrophoretic display appears to display a grid where transparent arrays are partitioned by black lines. This pattern embodies a so called 3D-barrier. The 3D-barrier allows light emitted by the LCD to be seen under different angles, thereby creating a multiple view display. The barrier can be seen as a grid of opaque (black) lines with transparent areas between the lines. Standard row-at-a-time addressing must be used to switch the picture elements into states 2 or 3 of FIG. 5, which states are used in this mode. Moreover, it is possible to change the multiple view by changing the state of the picture elements in the electrophoretic display. The transparent areas determine whether a specific picture element will be seen from a specific angle and equivalently, the opaque lines determine whether a specific picture element will be obscured from a specific angle. This allows the number of displayed views to be switched depending on the number of views present in a video content.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A display device comprising an outer display stacked with an inner display, said display device being arranged to be operated in a first, multiple view display mode (C) and a second, single view display mode (B), which display device is characterized in that said outer display is an electrophoretic display that is controllable to enable said display device to be operated in the first and the second display mode, wherein
said first and second display modes are achieved by means of controlling a potential difference across picture elements in said outer display, which picture elements are operable in at least one opaque state and one transparent state,
said first display mode being attained by arranging the inner display in an on-state and by arranging at least one of the picture elements in the outer display in the transparent state while the other picture elements in the outer display are in said at least one opaque state, and
said second display mode being attained by arranging the inner display in the on-state and by arranging the picture elements of the outer display in the transparent state, and
wherein said outer display further is arranged to be controllable to enable said display device to be operated in a third, low-power, single view mode (A), in which third mode the display device is consuming less power than in said second mode (B), said third mode being achieved by means of controlling a potential difference across picture elements in said electrophoretic display, the picture elements being operable in at least one further opaque state, said third display mode being attained by arranging the inner display in an off-state and by arranging the picture elements of the outer display in any one of the opaque states.

2. The display device according to claim 1, wherein said electrophoretic display is arranged to be controllable by applying drive signals to electrodes associated with each picture element to attain the potential difference, which causes charged particles arranged in an electrophoretic medium that is comprised in the electrophoretic display to move, whereby any one of said transparent state or said at least one opaque state is obtained.

3. The display device according to claim 2, wherein particles of a first polarity are arranged to be black and particles of a second polarity are arranged to be white, whereby at least two opaque states are obtained.

4. The display device according to claim 3, wherein particles are arranged to be of a further color.

5. The display device according to claim 4, wherein particles of different colors are arranged in different picture elements.

6. The display device according to claim 2, wherein said electrodes comprise at least two electrodes arranged at said picture elements such that they attract, by means of the applied drive signals, the respective charged particles, whereby a particle-free area is created at the picture elements that are to be set in the transparent state.

7. The display device according to claim 6, wherein said at least two electrodes (E1, E2) are arranged in proximity to each other and the area of one of the electrodes is arranged to be substantially smaller than the area of the other.

8. The display device according to claim 6, wherein said electrodes comprise at least three electrodes, wherein a third electrode (E3) is arranged in proximity to the first (E1) and the second (E2) electrode, onto which third electrode a voltage is briefly applied, such that only a fraction of the particles is moved, whereby a switchable grey filter is achieved.

9. The display device according to claim 2, wherein a first of said at least two electrodes attracts particles of the first polarity and a second of said at least two electrodes attracts particles of the second polarity.

10. The display device according to claim 3, wherein at least one of said electrodes (E1-E4) is coated with an organic photoconductor layer, the resistance of which layer is variable by means of varying inner display illumination onto said organic photoconductor layer.

11. The display device according to claim 1, wherein said inner display is an emissive display.

12. The display device according to claim 1, wherein said inner display is a color liquid crystal display.

13. The display device according to claim 1, wherein said inner display is an OLED display.

14. The display device according to claim 1, wherein said outer display is arranged to have a resolution that is higher than the resolution of said inner display.

* * * * *